Jan. 12, 1926.
H. S. BERGEN
1,569,609
WEIGHING SCALE
Filed July 22, 1920      2 Sheets-Sheet 1
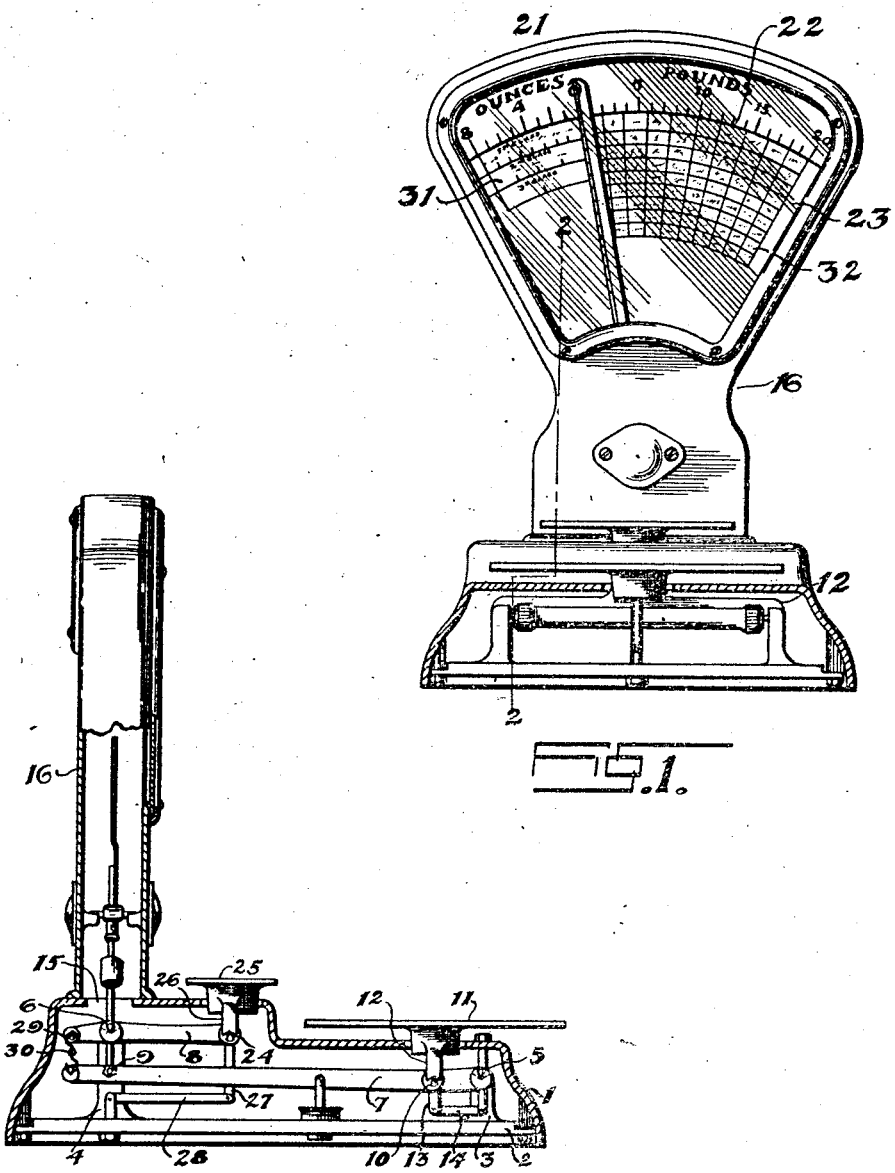
Inventor
HARRY S BERGEN
By George R. Frye
Attorney

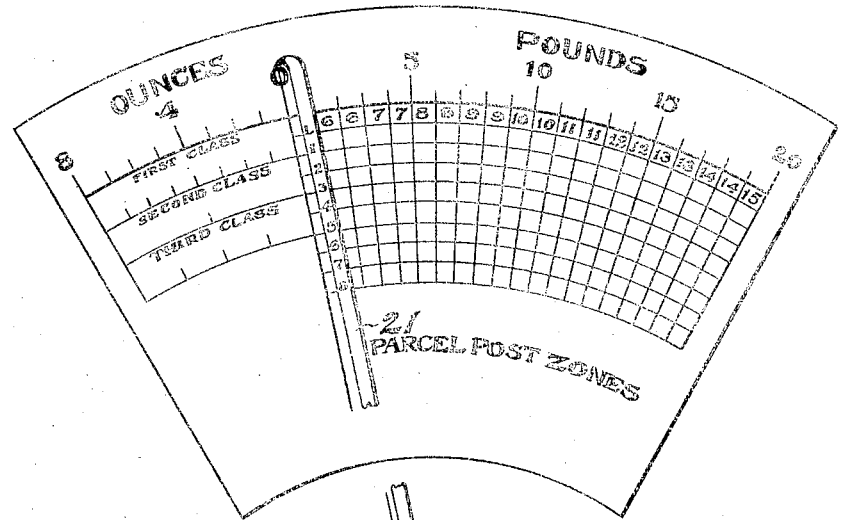
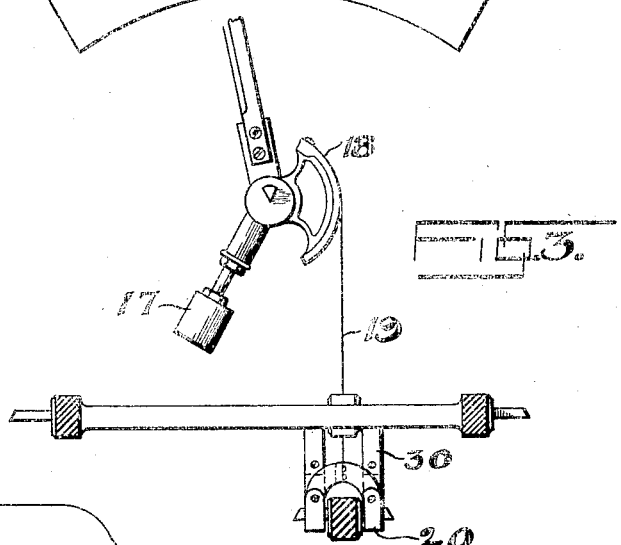
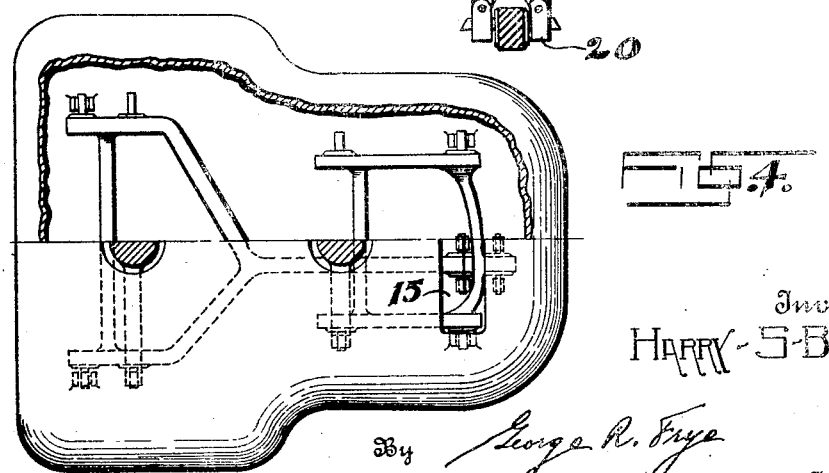

Patented Jan. 12, 1926.

1,569,609

UNITED STATES PATENT OFFICE.

HARRY S. BERGEN, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed July 22, 1920. Serial No. 398,049.

*To all whom it may concern:*

Be it known that I, HARRY S. BERGEN, a citizen of the United States, residing at Toledo, in the county of Lucas and State of Ohio, have invented certain new and useful Improvements in Weighing Scales, of which the following is a specification.

This invention relates to weighing scales, and one of its principal objects is the provision of automatic weighing mechanism having the sensitiveness requisite for accurately weighing small packages and the capacity for weighing packages of relatively great weight.

Another object of the invention is to provide an automatic scale having two platforms both located in front of the chart on which the weights or other valuables are indicated.

Another object is to provide a scale of this kind having one of the platforms so connected to the weighing mechanism that a load placed thereon will move the indicator hand through a relatively large arc, while the same load placed upon the other platform will move the indicator hand through a relatively small arc.

Another object is to so connect such platforms to the weighing mechanism that a load placed on one of the platforms causes the indicator to swing in one direction from zero position, while a load placed on the other platform causes the indicator to swing in the opposite direction.

Another object is the provision of a scale having an indicator adapted to co-operate with two sets of computations according to the kind of matter being weighed.

Still another object is the provision of a scale adapted for weighing and computing the postage on parcel post packages and also on other classes of mail matter.

Other objects and advantages will be apparent from the following description, in which reference is had to the accompanying drawings illustrating a preferred embodiment of my invention and wherein similar reference numerals designate similar parts throughout the several views.

In the drawings:—

Figure 1 is a front elevation of a scale embodying my invention, the base housing being shown in section;

Figure 2 is a vertical sectional view taken substantially on the line 2—2 of Figure 1;

Figure 3 is a fragmentary view showing the chart and connection between the pendulum mechanism and the platform levers; and Figure 4 is a plan view of the base with the housing removed, parts being broken away to show the platform levers.

I have shown my invention as applied to a scale having a fan-shaped chart and a hand directly connected to the pendulum, but it is to be understood that the invention is also adapted to be incorporated in scales having other types of load-offsetting mechanism, such, for example, as that controlled by springs, and that the indicator may be of the dial or other type.

The base 1 of the scale forms a housing which contains the platform levers. The floor 2 of the housing is detachable and supports fulcrum stands 3 and 4 upon which rest the fulcrum pivots 5 and 6 of the platform levers.

One of the levers 7 is of the second class, having its fulcrum 5 at one end and a nose pivot 9 adjacent its opposite end, while its load pivot 10 is located between the nose and fulcrum pivots and comparatively close to the load pivot.

A platform 11 is supported, by means of a spider 12 of common form, upon the load pivots 10 and is provided with a downwardly-extending stem 13 pivotally connected to a check link 14 to keep the platform level during weighing movements.

Adjacent the rear end of the upper side of the base 1 is an opening 15 over which is an upright housing 16 to support the load-offsetting and indicating mechanism of the scale. A pendulum 17 pivotally supported within the housing 16 is provided with a power sector 18 which is connected, by means of a flexible metallic ribbon 19 and a suitable stirrup 20, to the nose pivot 9 of the lever 7. Rigidly fixed to the pendulum is an indicator hand 21 which swings over a chart 22 visible through the transparent face 23 of the housing 16. The weight of the lever 7 and the parts carried thereby is sufficient to hold the pendulum several degrees out of plumb when the scale is empty and the zero graduation of the chart is located at some distance from the left side. When a load is placed upon the platform 11 the pendulum is still further elevated and the indicator hand swings to the right.

The lever 8 which is fulcrumed upon the stem 4 near the rear end of the base is of the first class, having its load pivots 24 at one end. A platter 25 of smaller size than the platform 11 is supported by means of a spider 26 upon the load pivots 24, the spider being provided with a stem 27 connected to a check link 28. The nose pivot 29 of the lever 8 is connected by means of links 30 to an extension of the lever 7. Thus, when a load is placed upon the platter 25 an upwardly-acting force is applied to the links 30 which relieves the ribbons 19 of some of the weight of the lever 7, so that the pendulum will be lowered to an extent substantially proportional to the weight of the load on the small platter 25.

The base 1 is stepped, as shown in Figure 2, and the small platter is elevated above the level of the platform 11 to minimize the probability of interference in weighing. The leverage upon which a load on the platter 25 acts is very much greater than the leverage of a load on the platform 11, and a light article on the platter 25 will cause the hand 21 to swing to the left many times the distance that the hand would swing to the right were the same article placed upon the platform 11. The mechanism is therefore well adapted for use in mailing scales, letters, etc. being weighed on the small platter 25 and parcel post packages being weighed on the platform 11.

The portion of the chart over which the hand 21 swings when a load is placed upon the platter 25 is graduated in ounces and marked, as at 31, with postal computations for the several classes of mail matter, so that the postage required for any given piece of mail matter is directly indicated by the hand when the piece is placed upon the platter. The portion of the chart over which the hand swings when a load is placed upon the large platform 11 is graduated in pounds and ounces and marked, as at 32, with parcel post computations for the several zones, so that the amount of postage required for any given package is directly indicated by the hand when the package is placed upon the platform.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a weighing scale, in combination, automatic load-offsetting mechanism, an indicator connected thereto, a pair of commodity-receivers located before said indicator, and means unequally and oppositely connecting said commodity-receivers to said automatic load-offsetting mechanism whereby loads on said platform move said indicator in opposite directions.

2. In a weighing scale, in combination, an indicator movable in two directions, a pair of commodity-receivers before said indicator, and means oppositely and unequally connecting said commodity-receivers to said indicator whereby loads on said platform move said indicator in opposite directions.

3. In a weighing scale, in combination, load-offsetting and indicating means movable in two directions, a pair of commodity-receivers before said indicating means, and means oppositely and unequally connecting said commodity-receivers to said load-offsetting means whereby loads on said platform move said indicating means in opposite directions.

4. In a weighing scale, in combination, a chart having independent sets of characters, an index, a plurality of commodity-receivers unequally connected to said index, and means for relatively moving said index and one of said sets of characters into indicating relation when a load is placed upon the commodity-receiver corresponding to such set of characters and means for moving said index and another set of characters into indicating relation when a load is placed upon the commodity-receiver corresponding to such other set of characters.

5. In a weighing scale, in combination, a chart having parcel post computations on one part of said chart and postal computations for other classes of mail matter on another part of said chart, an index, a platform for parcel post packages, a platter for other classes of other mail matter, and means for relatively moving said chart and index into indicating relation on the part of said chart having parcel post computations when a load is placed upon said platform and on the part of said chart having computations for other classes of mail matter when a load is placed upon said platter.

6. In a weighing scale, in combination, weighing mechanism, a pair of commodity-receivers supported by said weighing mechanism, a chart having a zero line, parcel post computations and postage computations for other classes of mail matter extending in opposite directions from said zero line, and an indicator connected to said weighing mechanism and movable over said parcel post computations when a load is placed upon one of said commodity-receivers and over said postage computations when a load is placed upon the other of said commodity-receivers.

7. In a weighing scale, in combination, load-offsetting mechanism, a lever having a fulcrum at one end, load pivots adjacent said fulcrum, a connection with said load-offsetting mechanism beyond said load pivots, a second lever having a fulcrum intermediate its ends, load pivots at one of its ends and having at its other end a connection to the first said lever, and commodity-receivers supported by the load pivots of the respective levers.

8. In a weighing scale, in combination, pendulum load-offsetting mechanism under partial load, a lever having a fulcrum at one end, load pivots adjacent said fulcrum, a connection with said load-offsetting mechanism beyond said load pivots, a second lever having a fulcrum intermediate its ends, load pivots at one of its ends and having at its other end a connection to the first said lever, and commodity-receivers supported by the load pivots of the respective levers.

9. In a weighing scale, in combination, load-offsetting mechanism, a lever having load pivots near its fulcrum, a connection from said load-offsetting mechanism to a point on said lever remote from said fulcrum, an auxiliary lever having a fulcrum intermediate its ends and load pivots remote therefrom, a connection from the first said lever to a point on said auxiliary lever near its fulcrum, and commodity-receivers supported by the load pivots of the respective levers.

10. In a weighing scale, in combination, pendulum load-offsetting mechanism under partial load, a lever having load pivots near its fulcrum, a connection from said load-offsetting mechanism to a point on said lever remote from said fulcrum, an auxiliary lever having a fulcrum intermediate its ends and load pivots remote therefrom, a connection from the first said lever to a point on said auxiliary lever near its fulcrum, and commodity-receivers supported by the load pivots of the respective levers.

HARRY S. BERGEN.